US012082007B2

(12) United States Patent
Griffin et al.

(10) Patent No.: US 12,082,007 B2
(45) Date of Patent: Sep. 3, 2024

(54) MAYDAY-RELAY MECHANISM IN A MESH NETWORK

(71) Applicant: Red Hat, Inc., Raleigh, NC (US)

(72) Inventors: Leigh Griffin, Waterford (IE);
Pierre-Yves Chibon, Paris la Defense (FR)

(73) Assignee: Red Hat, Inc., Raleigh, NC (US)

( * ) Notice: Subject to any disclaimer, the term of this patent is extended or adjusted under 35 U.S.C. 154(b) by 329 days.

(21) Appl. No.: 17/580,450

(22) Filed: Jan. 20, 2022

(65) Prior Publication Data
US 2023/0232254 A1     Jul. 20, 2023

(51) Int. Cl.
*H04W 24/04*     (2009.01)
*H04W 84/18*     (2009.01)

(52) U.S. Cl.
CPC ............ *H04W 24/04* (2013.01); *H04W 84/18* (2013.01)

(58) Field of Classification Search
None
See application file for complete search history.

(56) References Cited

U.S. PATENT DOCUMENTS

| | | |
|---|---|---|
| 8,660,480 B2 | 2/2014 | Jacobs et al. |
| 8,843,104 B2 | 9/2014 | Adibi et al. |
| 9,759,574 B2 | 9/2017 | Makled et al. |
| 10,536,211 B2 | 1/2020 | Leroux |
| 2015/0085639 A1* | 3/2015 | Chen ........................ H04L 45/22 370/218 |
| 2019/0007847 A1* | 1/2019 | Abramovitz ............ H04L 43/06 |
| 2021/0195684 A1* | 6/2021 | Sturek .................... H04W 88/06 |

FOREIGN PATENT DOCUMENTS

KR         102047848 B1     11/2019

OTHER PUBLICATIONS

Ali et al., "Position-Based Emergency Message Dissemination for Internet of Vehicles", School of Electrical Engineering and Computer Science (SEECS), National University of Sciences and Technology (NUST), published Jan. 13, 2019, pp. 1-12, https://journals.sagepub.com/doi/pdf/10.1177/1550147719861585.
Shadravan et al., "An Alert Message Propagation Scheme Considering Various Densities in VANET", published Jan. 30, 2014, pp. 1-10, https://scialert.net/fulltext/?doi=jas.2014.2812.2818.

* cited by examiner

*Primary Examiner* — Anh Ngoc M Nguyen
(74) *Attorney, Agent, or Firm* — Womble Bond Dickinson (US) LLP (57) ABSTRACT

A system and method of relaying distress calls in a mesh network of nodes. The method includes discovering, by a target node of the mesh network, a plurality of neighboring nodes of the target node that each have one or more types of communication capabilities with the target node. The method includes detecting, by the target node, a failure event associated with a resource of the target node. The method includes broadcasting, by the target node, a distress call indicative of the failure event to one or more neighboring nodes of the plurality of neighboring nodes of the target node to cause the one or more neighboring nodes to redirect the distress call to an egress node of the mesh network.

19 Claims, 4 Drawing Sheets

```
┌─────────────────────────────────────────────┐
│ discovering, by a target node of the mesh   │
│ network, a plurality of neighboring nodes   │
│ of the target node that each have one or    │
│ more types of communication capabilities    │
│ with the target node                        │
│                    302                      │
└─────────────────────────────────────────────┘
                       │
                       ▼
┌─────────────────────────────────────────────┐
│ detecting, by the target node, a failure    │
│ event associated with a resource of the     │
│ target node                                 │
│                    304                      │
└─────────────────────────────────────────────┘
                       │
                       ▼
┌─────────────────────────────────────────────┐
│ broadcasting, by the target node, a         │
│ distress call indicative of the failure     │
│ event to one or more neighboring nodes of   │
│ the plurality of neighboring nodes of the   │
│ target node to cause the one or more        │
│ neighboring nodes to redirect the distress  │
│ call to an egress node of the mesh network  │
│                    306                      │
└─────────────────────────────────────────────┘
```

MAYDAY-RELAY MECHANISM IN A MESH NETWORK

TECHNICAL FIELD

The present disclosure relates generally to software technology, and more particularly, to systems and methods for relaying a distress call in a mesh network.

BACKGROUND

A mesh network is a network in which devices—or nodes—are linked together, branching off other devices or nodes. These networks are set up to efficiently route data between devices and clients. They help organizations provide a consistent connection throughout a physical space.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

In a mesh network of mesh devices such as nanotechnology or Internet of Things (IoT) networks, the number of mesh devices can quickly grow to hundreds or thousands of mesh devices. Each mesh device includes mechanisms to communicate within the mesh network, but are incapable of communicating with devices outside of the mesh network. As such, there may be situations where a mesh device will not have outbound communication mechanisms and therefore a situation where a mesh device suffering a failure of a core component (e.g. a key processing capability) cannot be broadcast out to inform someone. This could lead to very unfortunate consequences, which in the case of nanotechnology, could even lead to the death of the hosting organism.

Aspects of the present disclosure address the above-noted and other deficiencies by implementing a distress call style protocol within a mesh network. A mesh network includes geographical neighbors, which are important for short range communication. A Mayday Relay Service (MRS) agent may be deployed within the mesh network to create logical groupings within a geographical hop range for the mesh devices. This means that an overlapping Venn diagram may be possible with mesh devices having different geographical neighbors. If a failure happens within a mesh device, then the MRS agent on each mesh device broadcasts a distress call with details of the failure and any other relevant metadata. The distress call propagates out to the neighboring mesh devices in the mesh network. If any neighboring mesh device is capable of answering the distress call (e.g., capable of relaying the information outside of the mesh network), then it responds to the distressed mesh device. The answering mesh device informs the group of mesh devices that neighbor the distressed mesh device to prevent multiple outbound messages. However, if the neighboring group is unable to handle the distress call, then a mesh device in the neighboring group may look up the MRS agent's routing table to identify another neighboring group that has not received the distress call, and push (e.g., redirect, relay) the distress call onward. This process repeats until the distress call is answered with an acknowledgement that cascades back through the mesh network. The MRS agent can be enhanced to offer recovery within the mesh network and/or enhanced with a routing table that identifies the mesh devices that have outbound communication capabilities.

Figure 1:
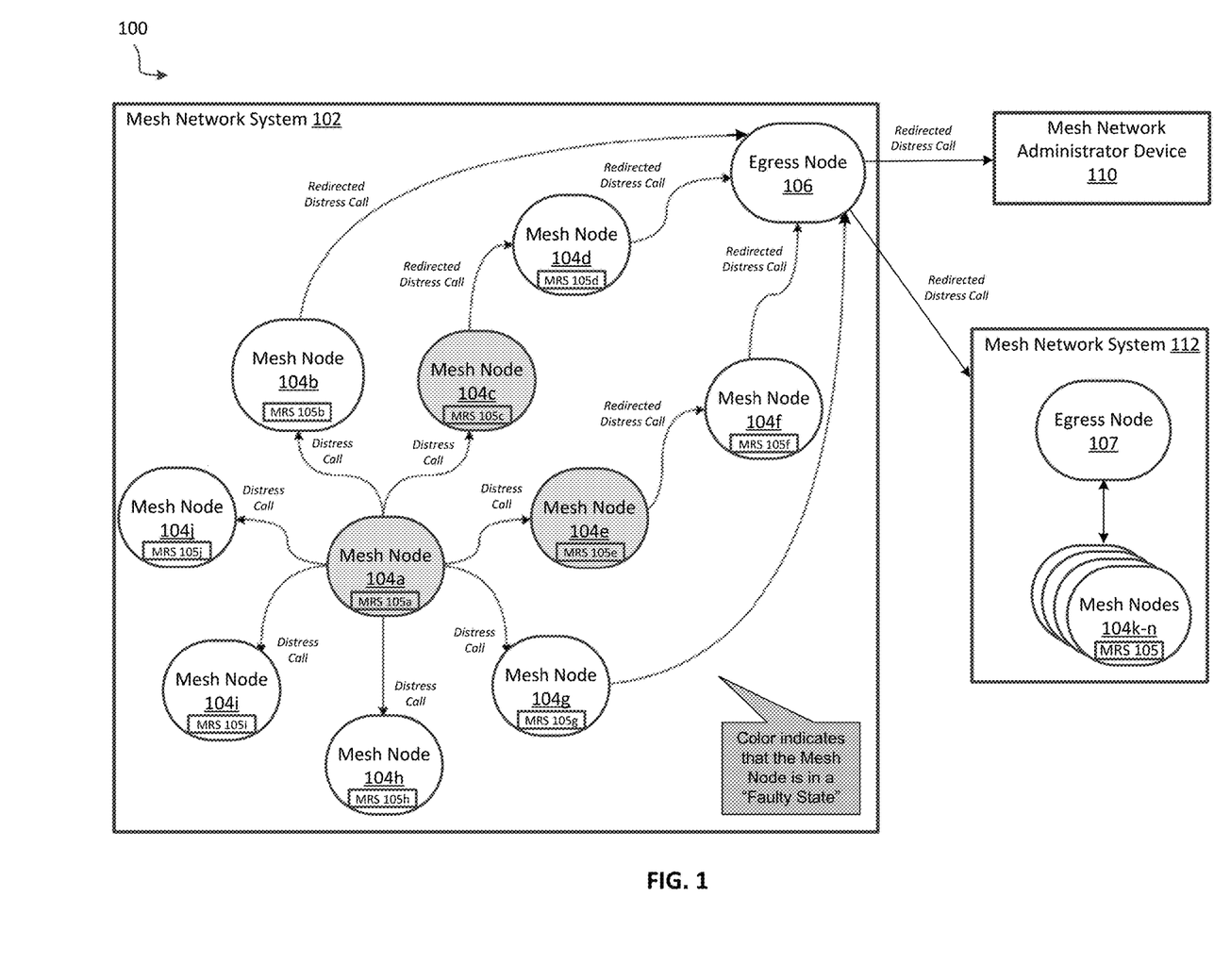
FIG. 1 is a block diagram depicting an example environment for relaying a distress call in a mesh network, according to some embodiments.

FIG. 1 is a block diagram depicting an example environment for relaying a distress call in a mesh network, according to some embodiments. The environment 100 includes a mesh network system 102, a mesh network system 112, and a mesh network administrator device 110. The mesh network system 102 includes mesh nodes 104 (e.g., mesh nodes 104a, 104b, 104c, 104d, 104e, 104f, 104g, 104h, 104i, 104j) and an egress node 106. The mesh network system 112 includes mesh nodes 104 (e.g., mesh nodes 104k, mesh nodes 104l, mesh nodes 104m, mesh nodes 104n) and an egress node 107. The egress node 106 of the mesh network system 102 is communicably coupled to the mesh network administrator device 110 and the egress node 107 of the mesh network system 112 via an external network (not shown in FIG. 1).

Each of the mesh nodes 104 execute a mayday relay service (MRS) agent that is configured to discover its neighboring mesh nodes 104, detect a failure event (e.g., error, fault) associated with a resource (e.g., hardware, software) of the mesh node 104 that is executing the MRS agent, and broadcast a distress call indicative of the failure event to one or more of the neighboring (e.g., adjacent, nearby) mesh nodes 104 to cause the one or more neighboring mesh nodes 104 to redirect the distress call to the egress node 106 of the mesh network system 102 or to another mesh node 104 in the mesh network system 102. Specifically, the mesh node 104a executes an MRS agent 105a, the mesh node 104b executes an MRS agent 105b, the mesh node 104c executes an MRS agent 105c, the mesh node 104d executes an MRS agent 105d, the mesh node 104e executes an MRS agent 105e, the mesh node 104f executes an MRS agent 105f, the mesh node 104g executes an MRS agent 105g, the mesh node 104h executes an MRS agent 105h, the mesh node 104i executes an MRS agent 105i, and the mesh node 104j executes an MRS agent 105j. Similarly, each of the mesh nodes 104k-n execute an MRS 105.

Each mesh node 104 of a mesh network system (e.g., mesh network system 102, mesh network system 104) may be positioned (e.g., arranged, organized) within the mesh network system such that the mesh node 104 is within a direct communication range (e.g., radio frequency range) of one or more neighboring mesh nodes 104 when using one or more types of communication capabilities.

As shown in FIG. 1, the mesh node 104a has neighboring mesh nodes that include mesh nodes 104b, 104c, 104e, 104g, 104h, 104i, 104j when using a first type of communication capability (e.g., a Bluetooth connection). The mesh node 104b has neighboring mesh nodes that include mesh nodes 104a and egress node 106 when using the first type of communication capability. The mesh node 104c has neighboring mesh nodes that include mesh node 104a and mesh node 104d when using the first type of communication capability. The mesh node 104e has neighboring mesh nodes that include mesh node 104a and mesh node 104f when using the first type of communication capability. The mesh node 104d has neighboring mesh nodes that include mesh node 104c and egress node 106 when using the first type of communication capability. The mesh node 104f has neighboring mesh nodes that include mesh node 104e and egress node 106 when using the first type of communication capability.

In some embodiments, a mesh node 104 in the mesh network system 102 may have a greater number of neighboring mesh nodes when using a second type of communication capability (e.g., a WLAN connection). For example, the mesh node 104b has neighboring mesh nodes that include mesh nodes 104a, 104c, 104j, and egress node 106 when using the second type of communication capability. The mesh node 104c has neighboring mesh nodes that include mesh nodes 104a, 104b, 104d, 104e when using the second type of communication capability. The mesh node 104d has neighboring mesh nodes that include mesh nodes 104c and egress node 106 when using the second type of communication capability. The mesh node 104e has neighboring mesh nodes that include mesh nodes 104a, 104c, 104f, 104g when using the second type of communication capability.

A mesh node 104 may directly communicate with its neighboring mesh nodes 104 by using one or more types of communication capabilities. A communication capability may include the hardware and/or software resources for communicating via a Bluetooth (BT) connection, a wireless local area network (WLAN) connection, and/or a near field communication (NFC) connection. In some embodiments, a mesh mode 104 includes the hardware and/or software resources for communicating via a cellular network (e.g., LTE, 5G, etc.). In some embodiments, a mesh mode 104 does not include the hardware and/or software resources for communicating via a cellular network (e.g., LTE, 5G, etc.).

In some embodiments, a mesh node 104 may be unable to directly communicate with a non-neighboring mesh node when using a particular communication capability because the non-neighboring node is outside of the radio frequency (RF) range of the particular communication capability. In some embodiments, a mesh node 104 that is unable to directly communicate with a non-neighboring mesh node may indirectly communicate with the non-neighboring node by directly communicating through a neighboring mesh node. For example, if the mesh node 104c wants to communicate with the egress node 106, then the mesh node 104c may send a message (e.g., a distress call) to mesh node 104d to cause the mesh node 104d to redirect (e.g., forward) the message to the egress node 106.

In some embodiments, a mesh node 104 that includes the hardware and/or software resources for communicating via a cellular network (e.g., LTE, 5G, etc.) may directly communicate with an egress node (e.g., egress node 107) of another mesh network system (mesh network system 112) without having to communicate through another mesh node. In some embodiments, a mesh node (e.g., mesh node 104a) in the mesh network system 102 that lacks the capability to communicate via a cellular connection is unable to directly communicate with a computing device (e.g., a mesh node, an egress node) of the mesh network system 112. In this instance, the mesh node 104a may only indirectly communicate with the computing device (e.g., a mesh node, an egress node) of the mesh network system 112 via the egress node 106 of the mesh network system 102

A mesh node 104 may directly communicate with a group of its neighboring nodes using a first type of communication capability and another group of neighboring nodes using a second type of communication capability. For example, the mesh node 104a may directly communicate with a first group (e.g., mesh node 104b, mesh node 104c) of its neighboring nodes using one or more Bluetooth connections and a second group (e.g., mesh node 104e, mesh node 104g) of its neighboring nodes using one or more WLAN connections.

A mesh node 104 may be in a non-faulted state or a faulted state. As shown in FIG. 1, mesh nodes 104a, 104c, 104e are each in a faulted state. In some embodiments, one or more of mesh nodes 104a, 104c, 104e may be started in a non-faulted state and then enter a faulted state. Conversely, FIG. 1 shows that mesh nodes 104b, 104d, 104f, 104g, 104h, 104i, 104j and egress node 106 are in a non-faulted state. In some embodiments, one or more of mesh nodes 104b, 104d, 104f, 104g, 104h, 104i, 104j and egress node 106 may be started in a faulted-state and then enter a non-faulted state.

A faulted state is when one or more resources of a mesh node 104 have reduced (e.g., partially or completely) functionality and/or performance. In some embodiments, a resource of a mesh node 104 may be a hardware resource (e.g., processing device, memory, storage, radio, modem, antenna, etc.) or a software resource (e.g., an application, libraries, files, containers, data/metadata, executables, etc.) that the mesh node 104 needs in order to communicate with another computing device (e.g., a mesh node, an egress node) and/or to provide a service (e.g., compute, storage, etc.) to another computing device. In some embodiments, a mesh node 104 may use different resources to establish different types of communication connections with another computing device. For example, mesh node 104a may use its Bluetooth radio (hardware) and Bluetooth software stack (software) to communicate with mesh node 104b. As another example, mesh node 104a may use its WLAN radio (hardware) and WLAN software stack (software) to communicate with mesh node 104b. As another example, mesh node 104a may use its NFC radio (hardware) and NFC software stack (software) to communicate with mesh node 104b.

An external network may be a public network (e.g., the internet), a private network (e.g., a local area network (LAN) or wide area network (WAN)), or a combination thereof. In some embodiments, an external network may include a wired or a wireless infrastructure, which may be provided by one or more wireless communications systems, such as wireless fidelity (Wi-Fi) connectivity to the external network and/or a wireless carrier system that can be implemented using various data processing equipment, communication towers (e.g. cell towers), etc. The external network may carry communications (e.g., data, message, packets, frames, etc.) between any other the computing device.

A mesh node 104, an egress node (e.g., egress device 106, egress node 107), and a mesh network administrator device 110 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may comprise a single machine or may include multiple interconnected machines (e.g., multiple servers configured in a cluster).

Still referring to FIG. 1, a mesh node 104 may be configured to discover (e.g., determine, find) its neighboring mesh nodes when using a particular type of communication capability. For example, mesh node 104a may be configured to discover its neighboring mesh nodes (e.g., mesh node 104b, mesh node 104c, mesh node 104e, mesh node 104g, mesh node 104h, mesh node 104i, mesh node 104j) when using a WLAN connection. In some embodiments, a mesh node 104 may be configured to discover its neighboring mesh nodes 104 while in a non-faulted state or a faulted state. In some embodiments, a mesh node 104 may be configured to discover its neighboring mesh nodes 104 by broadcasting a ping message outward using a particular communication capability and identifying the mesh nodes 104 that respond to the ping message as neighboring mesh nodes. In some embodiments, a mesh node 104 may be configured to discover a first groups of its neighboring mesh nodes when using a first type of communication capability, a second group of its neighboring mesh nodes when using a second type of communication capability, and so on.

In some embodiments, a mesh node 104 may be configured to generate (e.g., define) a mapping file (e.g., a group list, metadata, a file, a routing table) for a target mesh node (e.g., mesh node 104a) while in a faulted state or a non-faulted state, where the mapping file includes a plurality of neighboring mesh node identifiers, a plurality of group identifiers, and a plurality of communication capability identifiers. Each neighboring mesh node identifier is associated with a particular group identifier and a particular communication capability identifier to indicate that the target mesh node (e.g., mesh node 104a) may directly communicate with the neighboring mesh node that corresponds to the neighboring mesh node identifier by using the communication capability that corresponds to the particular communication capability identifier. In other words, the neighboring mesh node is within the communication range of the target mesh node (e.g., mesh node 104a) when using the particular communication capability (e.g., Bluetooth, WLAN, or NFC). The target mesh node may generate and update (e.g., add or remove entries) the mapping file responsive to performing a discovery of its neighboring mesh nodes 104.

Thus, the mapping file includes the one or more groups of neighboring mesh nodes for a target mesh node (e.g., mesh node 104a). For example, a mapping file for mesh node 104a may indicate a first group that includes mesh nodes 104b, 104c, 104e, 104g, 104h, 104i, 104j, which the mesh node 104a may communicate with when using a WLAN connection. The mapping file for mesh node 104a may also indicate a second group that includes mesh nodes 104b, 104c, 104e; which the mesh node 104a may communicate with when using a Bluetooth connection.

A mesh node (e.g., mesh node 104a) may be configured to detect (e.g., sense) a failure event associated with a resource (e.g., CPU, memory, storage, battery, an application, etc.) of the mesh node. In response to detecting the failure event, the mesh node may broadcast a distress call (shown in FIG. 1, "Distress Call") that is indicative of the failure event to one or more neighboring nodes of the mesh node to cause the one or more neighboring nodes to redirect the distress call to the egress node 106 of the mesh network system 102. In some embodiments, the egress node 106 may be configured to redirect the distress call to egress node 107 of mesh network system 112 and/or mesh network administrator device 110.

Upon receiving the distress call, the egress node 106, the egress node 107, or the mesh network system 112 may send a recovery message to the mesh node (e.g., mesh node 104) that broadcasted the distress call, which the mesh node 104 may use to heal (e.g., fix, resolve, repair) the resource. As a result of healing the resource, the mesh node (e.g., mesh node 104a) may change from a faulted state to a non-faulted state.

In some embodiments, the mesh node may determine which of its communication capabilities (e.g., Bluetooth, WLAN, or NFC) are not affected by the failure event and use one or more of those "functioning" communication capabilities when broadcasting the distress call to the one or more neighboring nodes. In some embodiments, a mesh node 104 may identify the group of its neighboring mesh nodes 104 that should receive the distress call by searching the mapping file for those neighboring mesh nodes 104 that are reachable via the "functioning" communication capability.

Although FIG. 1 shows only a select number of computing devices (e.g., mesh nodes 104, egress nodes 106, and mesh network administrator device 110), the environment 100 may include any number of computing devices that are interconnected in any arrangement to facilitate the exchange of data between the computing devices.

Figure 2A:
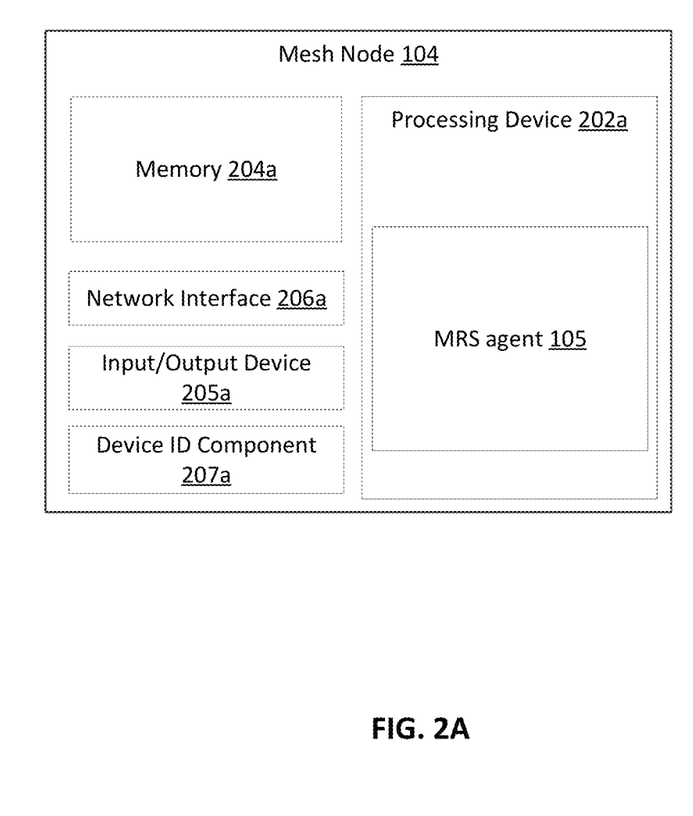
FIG. 2A is a block diagram depicting an example mesh node 104 of the mesh network system 102 in FIG. 1, according to some embodiments.

FIG. 2A is a block diagram depicting an example mesh node 104 of the mesh network system 102 in FIG. 1, according to some embodiments. While various devices, interfaces, and logic with particular functionality are shown, it should be understood that the one or more mesh nodes 104 (e.g., mesh nodes 104a-j) of the mesh network system 102 and the one or more mesh nodes 104 (e.g., 104k-n) of the mesh network system 112 each include any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The mesh node 104 includes a processing device 202a (e.g., general purpose processor, a PLD, etc.), which may be composed of one or more processors, and a memory 204a (e.g., synchronous dynamic random access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may comprise one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the mesh node 104. In some embodiments, the processing device 202a and the memory 204a form various processing devices and/or circuits described with respect to the mesh node 104. The instructions include code from any suitable computer programming language such as, but not limited to, C, C++, C#, Java, JavaScript, VBScript, Perl, HTML, XML, Python, TCL, and Basic.

The processing device 202a may execute a mayday relay service (MRS) agent 105 that is configured to discover its neighboring mesh nodes 104. In some embodiments, the MRS agent 105 of a target mesh node (e.g., mesh node 104a) may be configured to discover its neighboring mesh nodes 104 while the target mesh node is a non-faulted state or a faulted state. In some embodiments, the MRS agent 105 may be configured to discover its neighboring mesh nodes by broadcasting a ping message outward using a particular communication capability and identifying the mesh nodes 104 that respond to the ping message as neighboring mesh nodes.

In some embodiments, the MRS agent 105 may be configured to discover a first group of its neighboring mesh nodes when using a first type of communication capability (e.g., Bluetooth), a second group of its neighboring mesh nodes when using a second type of communication capability (e.g., NFC), and so on. In some embodiments, the MRS agent 105 may be configured to determine an impact of the failure event on the first type of communication capability. In some embodiments, the MRS agent 105 may be configured to select, responsive to determining the impact of the failure event, the one or more neighboring nodes 104 from the second group instead of the first group prior to broadcasting the distress call indicative of the failure event to the one or more neighboring nodes 104.

In some embodiments, the MRS agent 105 may be configured to prioritize a first group of neighboring nodes 104 over the second group of neighboring nodes 104 prior to detecting the failure event associated with the resource of the target mesh node (e.g., mesh node 104a). For example, the MRS agent 105 may choose to broadcast the distress call to the first group of neighboring nodes 104 instead of the second group of neighboring nodes 104 because the first group of neighboring nodes 104 uses a connection type (e.g., Bluetooth) that is currently active/enabled on the target mesh node (e.g., mesh node 104a) and the second group uses a connection type (e.g., WLAN) that is currently inactive/disabled on the target mesh node (e.g., mesh node 104a).

In some embodiments, the MRS agent 105 may be configured to receive an acknowledgement from a first mesh node (e.g., mesh node 104b) of the neighboring nodes 104 of the target mesh node (e.g., mesh node 104a) to redirect the distress call to the egress node 106 of the mesh network system 102. In some embodiments, the MRS agent 105 may be configured to prevent, responsive to receiving the acknowledgement from the first mesh node (e.g., mesh node 104b), a second mesh node (e.g., mesh node 104g) of the neighboring nodes of the target mesh node (e.g., mesh node 104a) from redirecting the distress call to the egress node 106 of the mesh network system 102. In other words, by only allowing a single neighboring node 104 to redirect the distress call to the egress node 106, the MRS agent 105 is able to prevent duplicate distress calls from cascading throughout the mesh network system 102; thereby reducing network congestion and excessive power consumption.

In some embodiments, the MRS agent 105 may be configured to receive an acknowledgement from the second mesh node (e.g., mesh node 104g) of the neighboring nodes 104 of the target mesh node (e.g., mesh node 104a) to redirect the distress call to the egress node 106 of the mesh network system 102. In some embodiments, the MRS agent 105 may be configured to determine, based on the mapping file, a difference between a first propagation delay associated with redirecting the distress call to the egress node 106 of the mesh network system 102 via the first mesh node (e.g., mesh node 104b) and a second propagation delay associated with redirecting the distress call to the egress node 106 of the mesh network system 102 via the second mesh node (e.g., mesh node 104g). In some embodiments, the MRS agent 105 may be configured to determine, based on the mapping file, that the difference indicates that the first propagation delay is less than the second propagation delay. In some embodiments, the MRS agent 105 may be configured to determine, based on the mapping file, that the difference indicates that redirecting the distress call to the egress node 106 of the mesh network system 102 via the first mesh node (e.g., mesh node 104b) is the shortest path to the egress node 106.

In some embodiments, the MRS agent 105 may be configured to select, responsive to determining the difference, the first mesh node (e.g., mesh node 104b) of the neighboring nodes 104 to redirect the distress call to the egress node 106 of the mesh network system 102 instead of the second mesh node (e.g., mesh node 104g) of the neighboring nodes 104 of the target mesh node (e.g., mesh node 104a). In some embodiments, the MRS agent 105 may be configured to select the first mesh node (e.g., mesh node 104b) instead of the second mesh node (e.g., mesh node 104g) responsive to determining, based on the mapping file, that the first propagation time is less than the second propagation time even though the target mesh node (mesh node 104a) receives an acknowledgement from the second mesh node before receiving an acknowledgement from the first mesh node.

In some embodiments, the MRS agent 105 may be configured to generate a mapping file (e.g., routing table) that includes the one or more groups of neighboring mesh nodes 104 of the target mesh node (e.g., mesh node 104a). In some embodiments, the MRS agent 105 may be configured to broadcast the mapping file to the one or more groups of neighboring mesh nodes 104 to cause each of the neighboring mesh nodes 104 to locally store the mapping file.

In some embodiments, the one or more neighboring nodes 104 of the target mesh node (e.g., mesh node 104a) may correspond to a first group of neighboring nodes 104 of the target mesh node, and the distress call may further cause a first mesh node (e.g., mesh node 104b) of the first group of neighboring nodes 104 to determine a capability of the first mesh node to redirect the distress call to the egress node 106 of the mesh network system 102, and broadcast a message (e.g., command) to the other mesh nodes 104 of the first group of neighboring nodes 104 to prevent the other mesh nodes 104 from redirecting the distress call to the egress node 106 of the mesh network system 102.

In some embodiments, the one or more neighboring nodes 104 of the target mesh node (e.g., mesh node 104a) may correspond to a first group of neighboring nodes 104 of the target mesh node, and the distress call may further cause a first mesh node (e.g., mesh node 104*b*) of the first group of neighboring nodes 104 to determine an incapability of the first mesh node to redirect the distress call to the egress node 106 of the mesh network system 102, identify a second mesh node (e.g., mesh node 104*g*) that has not received the distress call, and send a message to the second mesh node to cause the second mesh node to redirect the distress call to the egress node 106 of the mesh network system 102. In some embodiments, the first mesh node (e.g., mesh node 104*b*) of the first group of neighboring nodes 104 may determine that the second mesh node (e.g., mesh node 104*g*) has not received the distress call based on the mapping file. For example, mesh node 104*c* may determine that mesh node 104*d* has not received the distress call broadcasted by mesh node 104*a* by determining, based on the mapping file, that mesh node 104*d* is not a neighbor to mesh node 104*a*.

In some embodiments, the one or more neighboring nodes 104 of the target mesh node (e.g., mesh node 104*a*) may correspond to a first group of neighboring nodes 104 of the target mesh node, and the distress call may further cause a first mesh node (e.g., mesh node 104*b*) of the first group of neighboring nodes 104 to determine an incapability of the egress node 106 to answer the distress call, and redirect the distress call to the egress node 107 of the mesh network system 112. In some embodiments, the first mesh node (e.g., mesh node 104*b*) of the first group of neighboring nodes 104 may determine that the egress node 106 is incapable of answering the distress call because some or all of the mesh nodes 104 between the first mesh node and the egress node 106 are incapable of redirecting the distress call to the egress node 106. In some embodiments, the first mesh node (e.g., mesh node 104*b*) of the first group of neighboring nodes 104 may determine that the egress node 106 is incapable of answering the distress call because the egress node 106 cannot process (e.g., the egress node 106 is nonfunctional) the distress call.

In some embodiments, the MRS agent 105 may be configured to broadcast a distress call indicative of the failure event to one or more neighboring nodes 104 of the target mesh node (e.g., mesh node 104*a*) to cause the one or more neighboring nodes 104 to redirect the distress call to the egress node 106 of the mesh network system 102. In some embodiments, the distress call may include a device identifier associated with the MRS agent 105 and the target mesh node. In some embodiments, the distress call may include details about the actions (e.g., drawing excessive power, executing a specific application and/or virus, violating a security protocol) of the target mesh node that triggered the failure event associated with the one or more resources of the target mesh node.

The mesh node 104 includes a network interface 206*a* configured to establish a communication session with a computing device for sending and receiving data over a communication network to the computing device. Accordingly, the network interface 206*a* includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the host machine 104 includes a plurality of network interfaces 206*a* of different types, allowing for connections to a variety of networks, such as local area networks (public or private) or wide area networks including the Internet, via different sub-networks.

The mesh node 104 includes an input/output device 205*a* configured to receive user input from and provide information to a user. In this regard, the input/output device 205*a* is structured to exchange data, communications, instructions, etc. with an input/output component of the mesh node 104. Accordingly, input/output device 205*a* may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the mesh node 104, such as a built-in display, touch screen, microphone, etc., or external to the housing of the mesh node 104, such as a monitor connected to the mesh node 104, a speaker connected to the mesh node 104, etc., according to various embodiments. In some embodiments, the mesh node 104 includes communication circuitry for facilitating the exchange of data, values, messages, and the like between the input/output device 205*a* and the components of the mesh node 104. In some embodiments, the input/output device 205*a* includes machine-readable media for facilitating the exchange of information between the input/output device 205*a* and the components of the mesh node 104. In still another embodiment, the input/output device 205*a* includes any combination of hardware components (e.g., a touchscreen), communication circuitry, and machine-readable media.

The mesh node 104 includes a device identification component 207*a* (shown in FIG. 2A as device ID component 207*a*) configured to generate and/or manage a device identifier associated with the mesh node 104. The device identifier may include any type and form of identification used to distinguish the mesh node 104 from other computing devices. In some embodiments, to preserve privacy, the device identifier may be cryptographically generated, encrypted, or otherwise obfuscated by any device and/or component of mesh node 104. In some embodiments, the mesh node 104 may include the device identifier in any communication (e.g., distress call, redirect distress call) that the mesh node 104 sends to a computing device.

The mesh node 104 includes a bus (not shown), such as an address/data bus or other communication mechanism for communicating information, which interconnects the devices and/or components of mesh node 104, such as processing device 202*a*, network interface 206*a*, input/output device 205*a*, and/or device ID component 207*a*.

In some embodiments, some or all of the devices and/or components of mesh node 104 may be implemented with the processing device 202*a*. For example, the mesh node 104 may be implemented as a software application stored within the memory 204*a* and executed by the processing device 202*a*. Accordingly, such embodiment can be implemented with minimal or no additional hardware costs. In some embodiments, any of these above-recited devices and/or components rely on dedicated hardware specifically configured for performing operations of the devices and/or components.

Figure 2B:
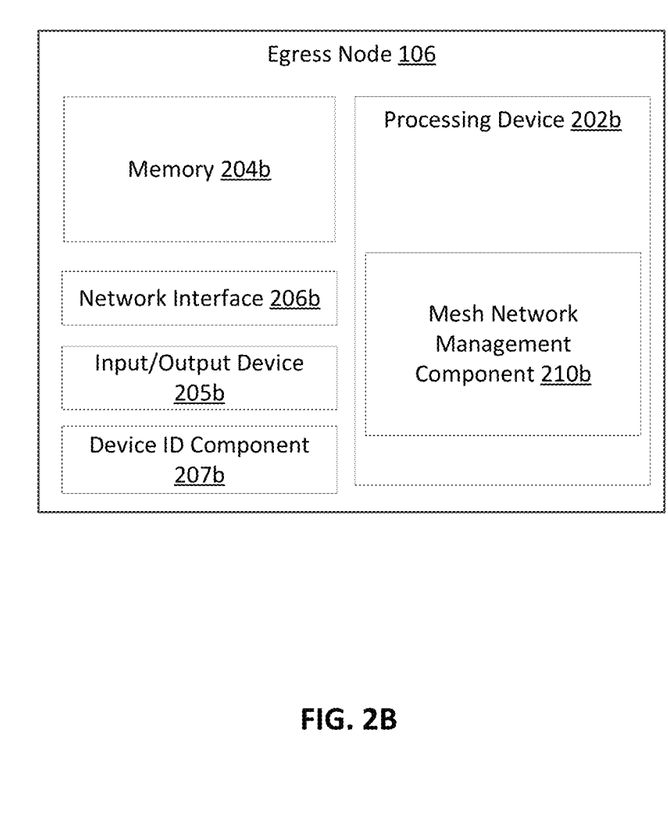
FIG. 2B is a block diagram depicting an example of the egress node 106 of the environment in FIG. 1, according to some embodiments.

FIG. 2B is a block diagram depicting an example of the egress node 106 of the environment in FIG. 1, according to some embodiments. While various devices, interfaces, and logic with particular functionality are shown, it should be understood that the egress node 106 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The egress node 106 includes a processing device 202b (e.g., general purpose processor, a PLD, etc.), which may be composed of one or more processors, and a memory 204b (e.g., synchronous dynamic random access memory (DRAM), read-only memory (ROM)), which may communicate with each other via a bus (not shown). The processing device 202b includes identical or nearly identical functionality as processing device 202a in FIG. 2a, but with respect to devices and/or components of the egress node 106 instead of devices and/or components of the mesh node 104.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the egress node 106 instead of devices and/or components of the mesh node 104.

The processing device 202b may execute a mesh network management component 210b that may be configured to receive a redirected distress call (shown in FIG. 1 as, Redirected Distress Call") from a mesh node 104 in the mesh network system 102, where the redirected distress call is indicative of a failure event associated with the one or more resources of a target mesh node (e.g., mesh node 104a). In some embodiments, the redirected distress call may include details about the actions (e.g., drawing excessive power, executing a specific application and/or virus, violating a security protocol) of the target mesh node that triggered the failure event associated with the one or more resources of the target mesh node.

In some embodiments, the mesh network management component 210b may generate a recovery message based on the failure event associated with the one or more resources of the target mesh node as indicated in the redirected distress call. The recovery message may include information that the target mesh node may use to heal the one or more resources. In some embodiments, the mesh network management component 210b may send the recovery message to the target mesh node (e.g., mesh node 104a) through the same path of mesh nodes 104 in which the mesh network management component 210b received the redirected distress call. In some embodiments, the mesh network management component 210b may send the recovery message to the target mesh node (e.g., mesh node 104a) through a different path of mesh nodes 104.

The egress node 106 includes a network interface 206b configured to establish a communication session with a computing device for sending and receiving data over a network to the computing device. Accordingly, the network interface 206b includes identical or nearly identical functionality as network interface 206a in FIG. 2A, but with respect to devices and/or components of the egress node 106 instead of devices and/or components of the mesh node 104.

The egress node 106 includes an input/output device 205b configured to receive user input from and provide information to a user. In this regard, the input/output device 205b is structured to exchange data, communications, instructions, etc. with an input/output component of the egress node 106. The input/output device 205b includes identical or nearly identical functionality as input/output device 205a in FIG. 2A, but with respect to devices and/or components of the egress node 106 instead of devices and/or components of the mesh node 104.

The egress node 106 includes a device identification component 207b (shown in FIG. 2B as device ID component 207b) configured to generate and/or manage a device identifier associated with the egress node 106. The device ID component 207b includes identical or nearly identical functionality as device ID component 207a in FIG. 2A, but with respect to devices and/or components of the egress node 106 instead of devices and/or components of the mesh node 104.

The egress node 106 includes a bus (not shown), such as an address/data bus or other communication mechanism for communicating information, which interconnects the devices and/or components of the egress node 106, such as processing device 202b, network interface 206b, input/output device 205b, device ID component 207b, and the mesh network management component 210b.

In some embodiments, some or all of the devices and/or components of egress node 106 may be implemented with the processing device 202b. For example, the egress node 106 may be implemented as a software application stored within the memory 204b and executed by the processing device 202b. Accordingly, such embodiment can be implemented with minimal or no additional hardware costs. In some embodiments, any of these above-recited devices and/or components rely on dedicated hardware specifically configured for performing operations of the devices and/or components.

Figure 3:
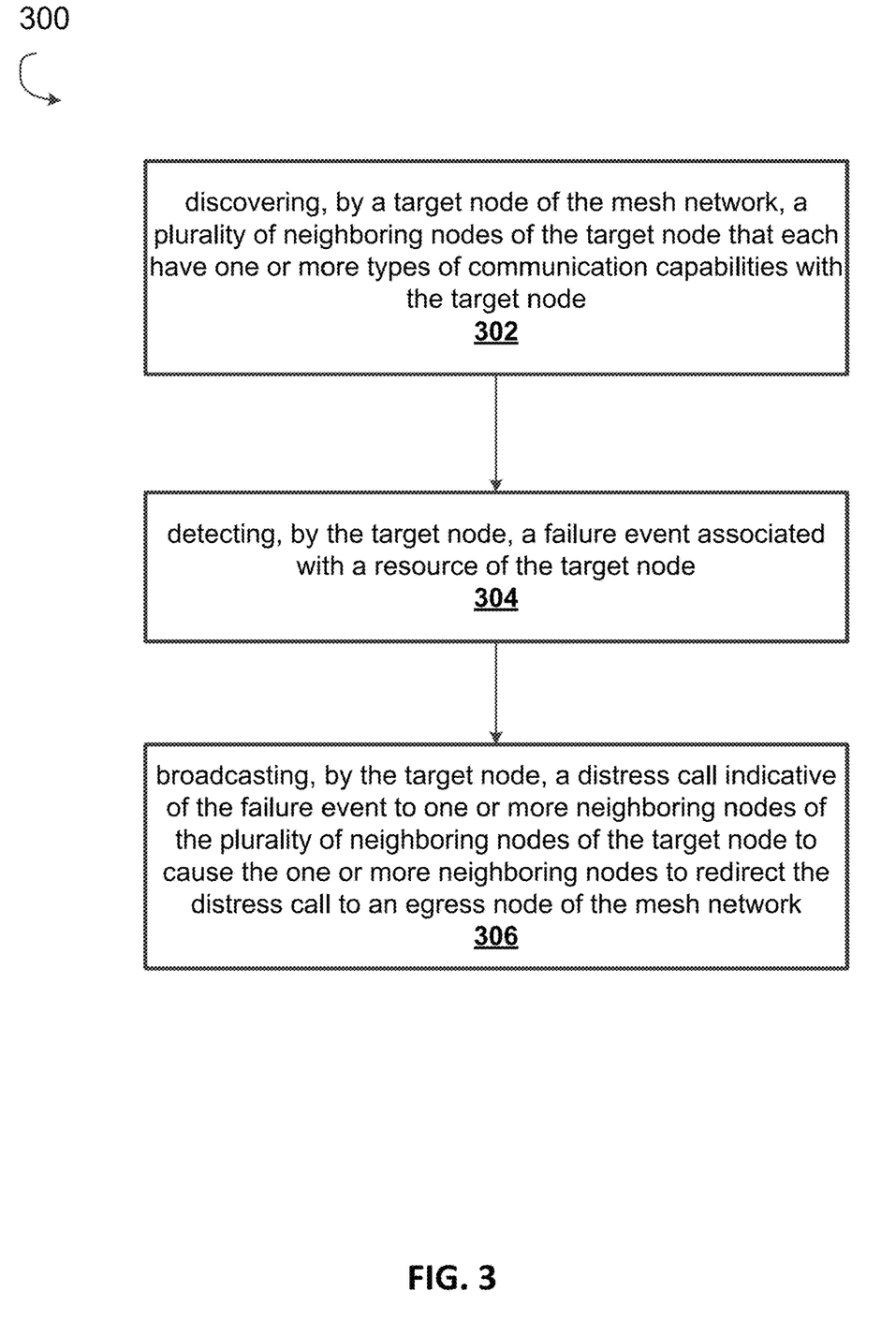
FIG. 3 is a flow diagram depicting a method for relaying a distress call in a mesh network, according to some embodiments.

FIG. 3 is a flow diagram depicting a method for relaying a distress call in a mesh network, according to some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 300 may be performed by one or more mesh node, such as mesh nodes 104 in FIG. 1. In some embodiments, method 300 may be performed by a mesh network system, such as mesh network system 102 in FIG. 1. In some embodiments, method 300 may be performed by an egress node, such as egress node 106 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of discovering, by a target node (e.g., mesh node 104a) of the mesh network, a plurality of neighboring nodes of the target node that each have one or more types of communication capabilities with the target node. The method 300 includes the block 304 of defining an aggregated node of the cloud service system corresponding to at least two computing devices of the plurality of computing devices. The method 300 includes the block 306 of exposing, to a scheduler of the cloud service system, an application programming interface (API) that is indicative of combined resources of the at least two computing devices of the plurality of computing devices. The method 300 includes the block 308 of receiving, by the scheduler responsive to receiving the API, a query to perform a workload requiring a set of resources that exceed the resources provided by each of the computing devices of the cloud service system. The method 300 includes the block 308 of forwarding, by the scheduler to the aggregated node, the query to cause the at least two computing devices to perform the workload using the combined resources of the least two computing device.

Figure 4:
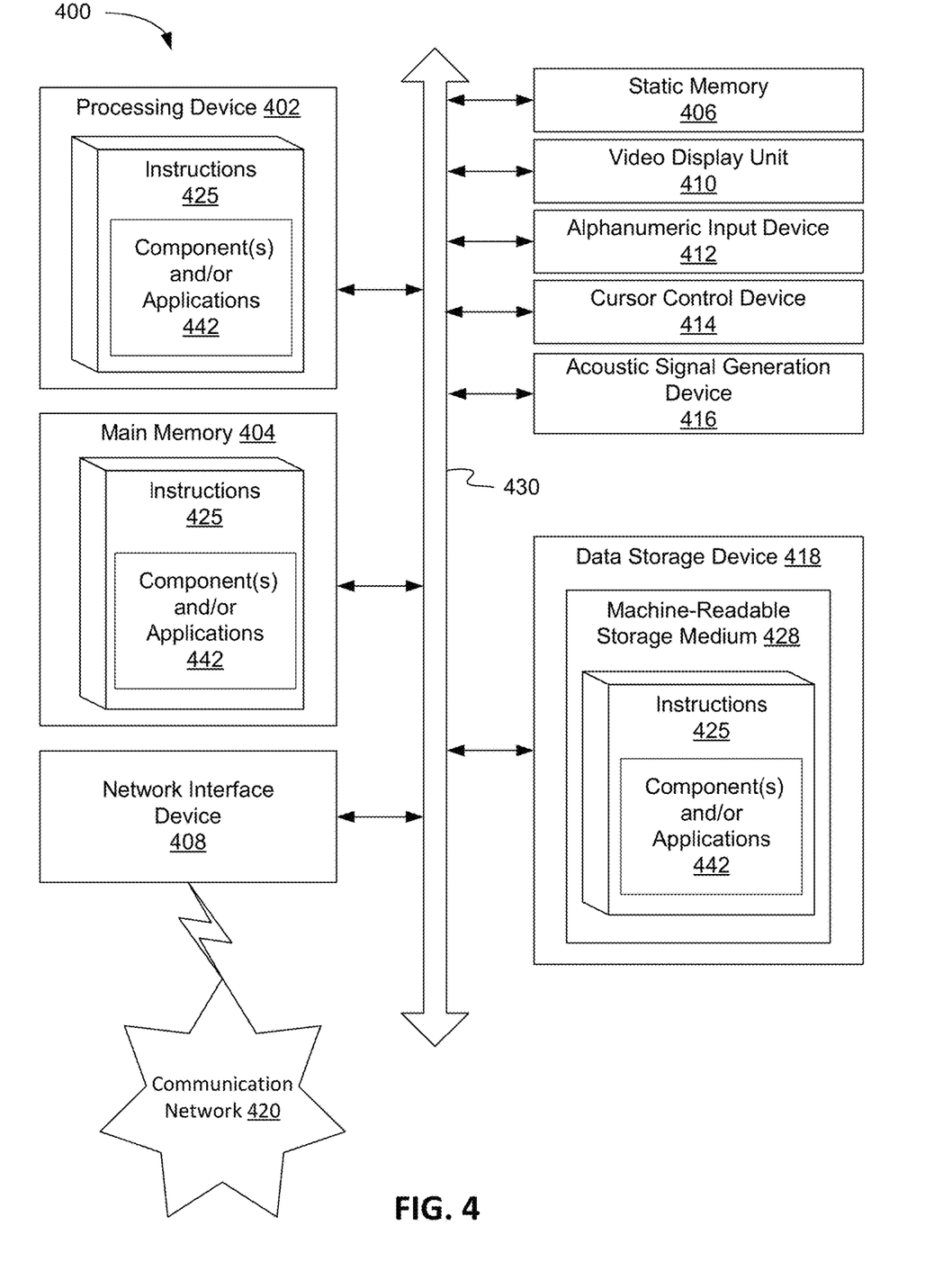
FIG. 4 is a block diagram of an example computing device that may perform one or more of the operations described herein, in accordance with some embodiments.

FIG. 4 is a block diagram of an example computing device 400 that may perform one or more of the operations described herein, in accordance with some embodiments. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a communication network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for one or more components and/or applications 442 (e.g., MRS agent 105 in FIG. 2a, mesh network management component 210b in FIG. 2B) for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a communication network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "discovering," "detecting," "broadcasting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method of relaying distress calls in a mesh network of nodes, the method comprising:
   discovering, by a target node of the mesh network, a plurality of neighboring nodes of the target node that each have one or more types of communication capabilities with the target node;
   detecting, by the target node, a failure event associated with a resource of the target node; and
   broadcasting, by the target node, a distress call indicative of the failure event to the plurality of neighboring nodes of the target node to cause a first node of the plurality of neighboring nodes to redirect the distress call to an egress node of the mesh network, determine a capability of the first node to redirect the distress call to the egress node of the mesh network, and broadcast a message to a second node of the plurality of neighboring nodes to prevent the second node from redirecting the distress call to the egress node of the mesh network.

2. The method of claim 1, further comprising:
   determining, by the target node, a first group of the plurality of neighboring nodes of the target node having a first type of communication capability with the target node;
   determining, by the target node, a second group of the plurality of neighboring nodes of the target node having a second type of communication capability with the target node;
   determining, by the target node, an impact of the failure event on the first type of communication capability with the target node; and
   selecting, by the target node responsive to determining the impact of the failure event, the second group instead of the first group prior to broadcasting the distress call indicative of the failure event to the plurality of neighboring nodes of the target node.

3. The method of claim 2, further comprising:
   prioritizing, by the target node, the first group of the plurality of neighboring nodes of the target node over the second group of the plurality of neighboring nodes of the target node prior to detecting the failure event associated with a resource of the target node.

4. The method of claim 2, wherein the one or more types of communication capabilities comprise a capability to communicate with the target node using at least one of a Bluetooth (BT) connection, a wireless local area network (WLAN) connection, or a near field communication (NFC) connection.

5. The method of claim 1, further comprising:
   receiving, by the target node, a first acknowledgement from the first node of the plurality of neighboring nodes of the target node to redirect the distress call to the egress node of the mesh network; and
   preventing, by the target node responsive to receiving the first acknowledgement, a third node of the plurality of neighboring nodes of the target node from redirecting the distress call to the egress node of the mesh network.

6. The method of claim 5, further comprising:
   receiving, by the target node, a third acknowledgement from the third node of the plurality of neighboring nodes of the target node to redirect the distress call to the egress node of the mesh network;
   determining, by the target node, a difference between a first propagation delay associated with redirecting the distress call to the egress node of the mesh network via the first node and a third propagation delay associated with redirecting the distress call to the egress node of the mesh network via the third node; and
   selecting, by the target node responsive to determining the difference, the first node of the plurality of neighboring nodes of the target node to redirect the distress call to the egress node of the mesh network instead of the third node of the plurality of neighboring nodes of the target node.

7. The method of claim 1, wherein the distress call further causes the first node to: determine an incapability of the first node to redirect the distress call to the egress node of the mesh network, identify a third node that has not received the distress call, and send a different message to the third node to cause the third node to redirect the distress call to the egress node of the mesh network.

8. The method of claim 1, wherein the distress call further causes the first node to: determine an incapability of the egress node to answer the distress call, and redirect the distress call to a second egress node of a second mesh network.

9. The method of claim 8, wherein the first node redirects the distress call to the second egress node of the second mesh network using a cellular network.

10. The method of claim 1, further comprising:
generating, by the target node, a routing table comprising a plurality of identifiers to the plurality of neighboring nodes of the target node responsive to discovering the plurality of neighboring nodes; and
broadcasting, by the target node, the routing table to the plurality of neighboring nodes of the target node to cause each of the neighboring nodes of the plurality of neighboring nodes to locally store the routing table.

11. The method of claim 1, further comprising:
receiving, by the target node, a recovery message sent by the egress node of the mesh network responsive to broadcasting the distress call indicative of the failure event to the plurality of neighboring nodes of the target node; and
healing, by the target node, the resource of the target node using the recovery message.

12. A mesh network system, comprising:
a plurality of computing devices, wherein each computing device corresponds to a respective node of a plurality of nodes of the mesh network system, each computing device comprises a processing device,
wherein the processing device of a target node of the plurality of nodes to:
discover a plurality of neighboring nodes of the target node that each have one or more types of communication capabilities with the target node;
detect a failure event associated with a resource of the target node; and
broadcast a distress call indicative of the failure event to the plurality of neighboring nodes of the target node to cause a first node of the plurality of neighboring nodes to redirect the distress call to an egress node of the mesh network, determine a capability of the first node to redirect the distress call to the egress node of the mesh network, and broadcast a message to a second node of the plurality of neighboring nodes to prevent the second node from redirecting the distress call to the egress node of the mesh network.

13. The mesh network system of claim 12, wherein the processing device of the target node to:
determine a first group of the plurality of neighboring nodes of the target node having a first type of communication capability with the target node;
determine a second group of the plurality of neighboring nodes of the target node having a second type of communication capability with the target node;
determine an impact of the failure event on the first type of communication capability with the target node; and
select, responsive to determining the impact of the failure event, the second group instead of the first group prior to broadcasting the distress call indicative of the failure event to the plurality of neighboring nodes of the target node.

14. The mesh network system of claim 13, wherein the processing device of the target node to:
prioritize the first group of the plurality of neighboring nodes of the target node over the second group of the plurality of neighboring nodes of the target node prior to detecting the failure event associated with a resource of the target node.

15. The mesh network system of claim 12, wherein the processing device of the target node to:
receive a first acknowledgement from the first node of the plurality of neighboring nodes of the target node to redirect the distress call to the egress node of the mesh network; and
prevent, responsive to receiving the first acknowledgement, a third node of the plurality of neighboring nodes of the target node from redirecting the distress call to the egress node of the mesh network.

16. The mesh network system of claim 15, wherein the processing device of the target node to:
receive a third acknowledgement from the third node of the plurality of neighboring nodes of the target node to redirect the distress call to the egress node of the mesh network;
determine, by the target node, a difference between a first propagation delay associated with redirecting the distress call to the egress node of the mesh network via the first node and a third propagation delay associated with redirecting the distress call to the egress node of the mesh network via the third node; and
select, by the target node responsive to determining the difference, the first node of the plurality of neighboring nodes of the target node to redirect the distress call to the egress node of the mesh network instead of the third node of the plurality of neighboring nodes of the target node.

17. The mesh network system of claim 12, wherein at least one of:
the distress call further causes the first node to: determine a capability of the first node to redirect the distress call to the egress node of the mesh network and broadcast the message to the second node responsive to determining the capability to redirect the distress call,
the distress call further causes the first node to: determine an incapability of the first node to redirect the distress call to the egress node of the mesh network, identify a third node that has not received the distress call, and send a different message to the third node to cause the third node to redirect the distress call to the egress node of the mesh network, or
the distress call further causes the first node to: determine an incapability of the egress node to answer the distress call, and redirect the distress call to a second egress node of a second mesh network.

18. The mesh network system of claim 12, wherein the processing device of the target node further to:
receive, by the target node, a recovery message sent by the egress node of the mesh network responsive to broadcasting the distress call indicative of the failure event to the plurality of neighboring nodes of the target node; and heal, by the target node, the resource of the target node using the recovery message.

19. A non-transitory computer-readable medium storing instructions that, when execute by a processing device of a target node of a mesh network system, cause the processing device to:
discover a plurality of neighboring nodes of the target node of the mesh network system that each have one or more types of communication capabilities with the target node;
detect a failure event associated with a resource of the target node; and
broadcast a distress call indicative of the failure event to neighboring nodes of the target node to cause a first node of the plurality of neighboring nodes to redirect the distress call to an egress node of the mesh network, determine a capability of the first node to redirect the distress call to the egress node of the mesh network, and broadcast a message to a second node of the plurality of neighboring nodes to prevent the second node from redirecting the distress call to the egress node of the mesh network.

* * * * *